United States Patent [19]

Nero et al.

[11] 3,816,846

[45] June 11, 1974

[54] HUE CORRECTION SYSTEM

[75] Inventors: Leroy W. Nero, Fort Wayne, Ind.; Kenneth A. Merriweather, Evanston, Ill.

[73] Assignee: Warwick Electronics, Inc., Chicago, Ill.

[22] Filed: Nov. 1, 1972

[21] Appl. No.: 302,849

[52] U.S. Cl. .................................. 358/28, 358/23

[51] Int. Cl. .................................. H04n 9/50

[58] Field of Search ....... 178/5.4 R, 5.4 SD, 5.4 HE

[56] References Cited

UNITED STATES PATENTS

| | | | |
|---|---|---|---|
| 3,647,941 | 3/1972 | Andrade et al. | 178/5.4 HE |
| 3,715,472 | 2/1973 | McTaggart | 178/5.4 HE |
| 3,717,727 | 2/1973 | Davidse et al. | 178/5.4 SD |
| 3,729,578 | 4/1973 | Slusarski | 178/5.4 HE |

*Primary Examiner*—Robert L. Richardson
*Attorney, Agent, or Firm*—Hofgren, Wegner, Allen, Stellman & McCord

[57] ABSTRACT

In the chroma channel of a color television receiver, a pair of color demodulators demodulate along wide angle axes of reduced included angle in the flesh tone region. A third demodulator, in response to the presence of green and cyan hues in a chroma signal, generates a proportional correction signal which is subtracted from a demodulated B-Y color difference signal to correct for errors in the green and cyan regions caused by wide angle demodulation.

12 Claims, 8 Drawing Figures

HUE CORRECTION SYSTEM

BACKGROUND OF THE INVENTION

This invention related to a hue correction system for a color television receiver, and more particularly to a hue correction circuit for demodulation systems having flesh tone enhancement.

Various hue modification circuits have been developed to eliminate the need for frequent adjustment of the tint or hue control of a color television receiver. Without special circuits, frequent readjustment of the control is necessary when changes occur in the received channel, the program scene, or the camera televising a particular scene. Hue or tint errors are most apparent to the viewer when the televised scene contains what should be normal flesh tones. Many correction techniques have been developed to eliminate variations in flesh tones, but most of these techniques in turn distort other colors, particularly green and cyan tones. Distortion of the green tones in a scene is very noticeable because of the large number of familiar objects which are green, such as grass, trees, plants, etc. With the exception of flesh tones, distortion of green tones in a scene is generally more objectionable than distortion of other colors such as red and magenta.

In the American Standard NTSC color transmission system, color hues are defined by the phase of a chroma signal with respect to a reference or burst signal arbitrarily designated as having a phase angle of 180°. In conventional color television receivers, the chroma channel includes at least a pair of color demodulators which extract information at a pair of demodulation axes which bear a predetermined angular relationship with respect to the burst. The noted tint errors occur when the predetermined relationship between chroma and burst changes due to phase shift of some component of the received color television signal.

Wide angle demodulation is the technique by which the angles between the demodulation axes are opened from 90° to something in the vicinity of 135°, compressing the included angle in the vicinity of the flesh or orange hues. A receiver operating in this manner is disclosed in the pending patent application of George G. LeCrenn and John H. Furrey, Ser. No. 120,962, filed Mar. 4, 1971, entitled "Color Gamut Compressor", and assigned to the same assignee as the present application. Other means for enhancing the flesh tones are also known, such as a hue expander operating solely in the vicinity of flesh tones, or circuits which combine demodulated B-Y and R-Y signals to develop a correction signal which is inserted upstream of the point at which the B-Y and R-Y signals are monitored to develop the correction signal.

All such correction techniques have various disadvantages. Wide angle demodulation produces the desired effect in the flesh tone region, but causes errors in the green and cyan regions. A hue expander operating solely in the flesh tone region is accurate, but highly complex. Circuits which combine R-Y and B-Y to develop a correction signal have included a green correction circuit. However, such circuits are not adapted to wide angle demodulation, cannot correct for both green and cyan, and furthermore are relatively complex.

SUMMARY OF THE INVENTION

In accordance with the present invention, the disadvantages of prior hue correction techniques are overcome by using a wide angle demodulation system which incorporates green and cyan correction. The circuit is extremely simple to operate and very inexpensive, producing results comparable to more complex techniques for correcting green tones when enhancing flesh tones. The disclosed correction techniques are adapted for use with chroma circuitry of various forms, including receivers utilizing integrated circuit demodulators in which internal circuit modification is not practical or desirable.

The applicant provides a third demodulator to detect the necessity for green-cyan correction. Upon detection of chroma signals which require correction, a continuous correction signal is developed for insertion into one color difference channel of a pair of wide angle demodulators. The correction signal continuously modifies the amount of correction depending upon the saturation of the received green-cyan tones. The correction technique is equally usable with other tones located along other axes of the color vector diagram.

One object of the present invention is a green-cyan correction circuit for use with wide angle demodulators which enhance or modify flesh tones.

Another object of the present invention is the provision of a color television demodulation system having at least a pair of color output demodulators, and a third demodulator for green correction.

Other objects and advantages of the present invention will be apparent from the following description, and from the drawings. While illustrative embodiments of the invention are shown in the drawings and will be described in detail herein, the invention is susceptible of embodiment in many different forms and it should be understood that the present disclosure is to be considered as an exemplification of the principles of the invention and is not intended to limit the invention to the embodiments illustrated. Throughout the specification, values will be given for certain of the components in order to disclose a complete, operative embodiment of the invention. However, it should be understood that such values are merely representative and are not critical unless specifically so stated.

GENERAL OPERATION OF WIDE ANGLE DEMODULATORS

Figures 1, 2:
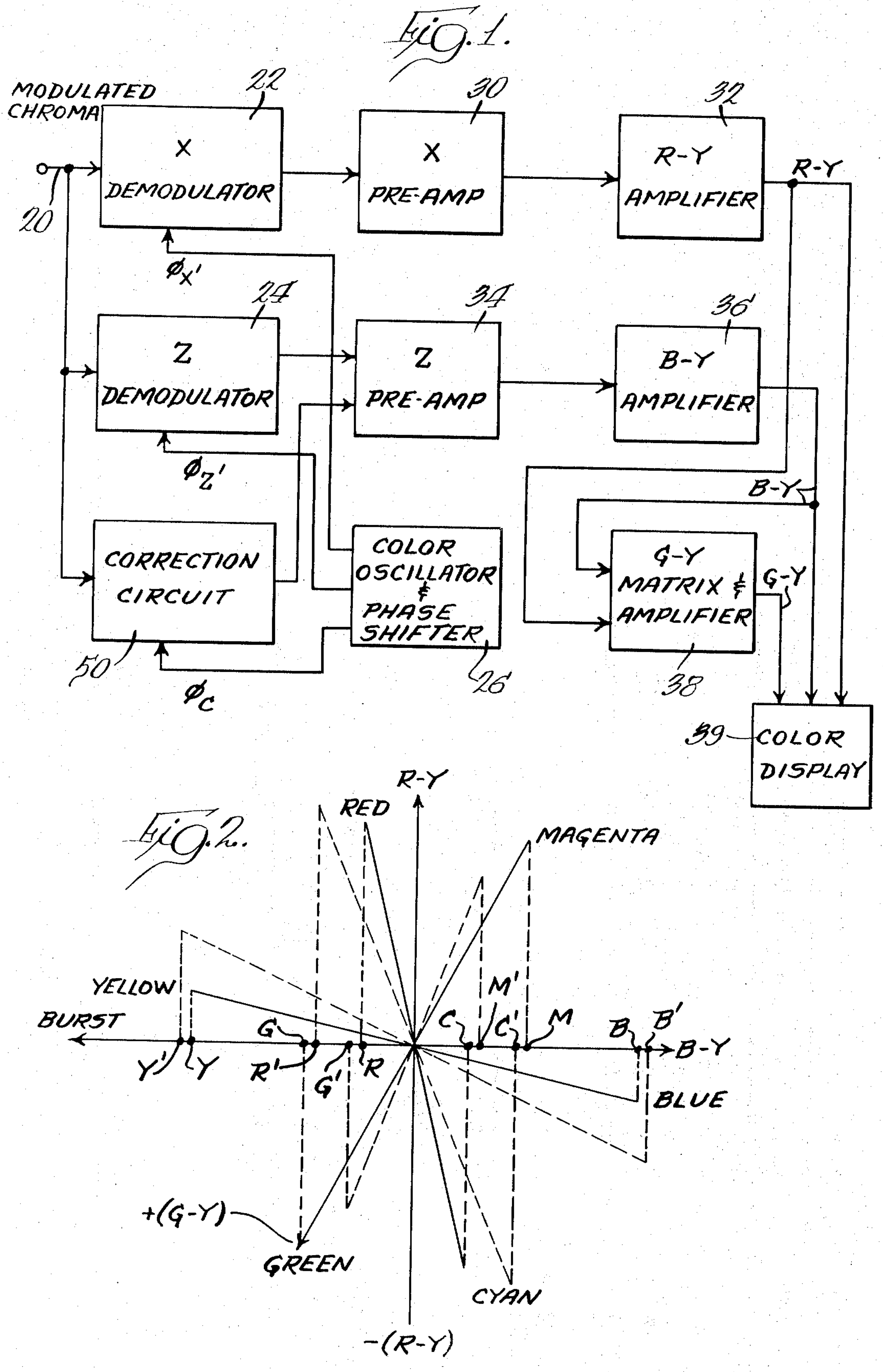
FIG. 1 is a block diagram of the chroma demodulation channel of a color television receiver, incorporating a novel hue correction circuit.
FIG. 2 is a color vector diagram illustrating the demodulated output from a conventional or linear transposition demodulator, and for a wide angle demodulator.

Turning to FIG. 1, a modified demodulation channel of an otherwise conventional color television receiver is illustrated. A modulated chroma signal is coupled via an input line 20 to an X axis demodulator 22 and a Z axis demodulator 24. The pair of demodulators 22, 24 demodulate along phase angle sensitive axes corresponding to the phase angle of corresponding input reference signals $\phi_x$ , and $\phi_z$ . The reference signals $\phi$, at a frequency of 3.58 megahertz, are generated by a color oscillator and phase shifter circuit 26. The presence of a prime (') indicates wide angle demodulation, as will be explained.

The demodulated output of the X demodulator 22 is coupled through an X preamplifier 30 and a R-Y amplifier 32. The demodulated output of the Z axis demodulator 24 is coupled through a Z preamplifier 34 and a B-Y amplifier 36. The color difference outputs R-Y and B-Y of amplifiers 32 and 24 are coupled to a G-Y matrix and amplifier 38 which develops a G-Y color difference output. All of the color difference signals are coupled to a tri-color display 39, such as a color television picture tube. The blocks described above are conventional, and may take various forms. For example, while the illustrated system employs X-Z demodulation, the principles of this invention are applicable to other demodulation systems, such as I-Q, etc.

The phase angle between reference signals $\phi_x$ and $\phi_z$ (without wide angle demodulation) is conventionally 90°, although depending on the phosphors used in the CRT a slightly larger angle may be necessary for equivalent "high fidelity" color reproduction. However, for practical purposes, such slight opening of the phase angle does not accomplish the flesh tone stabilization nor degrade the greens as does true wide angle demodulation. Both X and Z color demodulators produce outputs which have amplitudes proportional to the instantaneous component of the chroma signal which lies along the demodulation axis coinciding in phase to the reference signal $\phi$ supplied thereto.

In FIG. 2, a color vector phase diagram illustrates the phase angles for various colors produced by conventional demodulation (solid lines) and wide angle demodulation (dashed lines). To improve the rendition of flesh tones, the included angle between the demodulation axes is opened from 90° to something in the vicinity of 135°. This is accomplished by shifting both the X and Z demodulation axes to wide angle phase positions. The effects of this color shift are generally to shift the vectors in the second quadrant towards the orange region.

For example, the B-Y component of yellow Y is shifted along the B-Y axis by wide angle demodulation to a new position Y', which also increases saturation. Similarly, red R shifts to a new point R', and also experiences an increase in saturation. Thus, colors on either side of normal flesh color (orange) are shifted towards normal flesh color, and phase errors which otherwise would cause variations in the received flesh tone have a minimum effect since all hues in the second quadrant are compressed.

The desirable distortion produced in the flesh tone region is accompanied by undesirable distortions produced for colors located in other quadrants. As a result, green G is shifted to point G', closer to cyan, while cyan C is shifted to point C', closer to blue. The present invention corrects for these latter undesirable phase shifts.

HUE CORRECTION FOR WIDE ANGLE DEMODULATORS

Figures 3A, 3B, 3C:
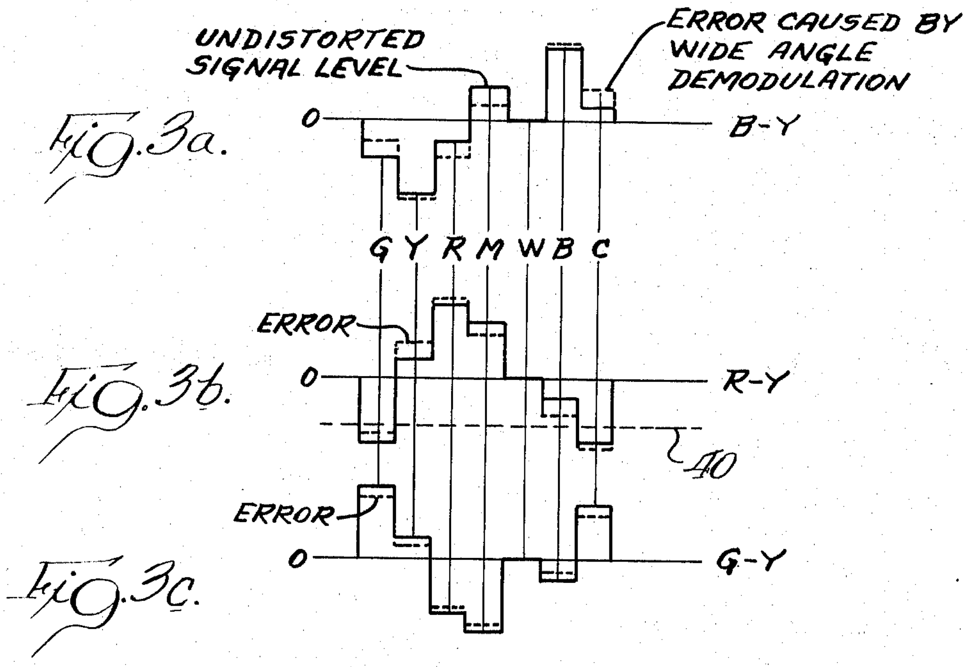
FIGS. 3A, 3B and 3C illustrate the B-Y, R-Y and G-Y signals, respectively, developed for a color bar pattern, and indicate the errors introduced by wide angle modulation.

FIGS. 3A, 3B and 3C illustrate how a color bar pattern varies the color difference signals produced by a conventional demodulation system (solid lines) and a wide angle demodulation system (dashed lines). It can be seen from FIG. 3A that the tendency of wide angle demodulation is to distort considerably the B-Y signal for green G, red R, magenta M and cyan C. The green G and cyan C distortions are similar in that the B-Y signal is increased by approximately equal increments.

In accordance with the present invention, the B-Y signal from a wide angle demodulator is returned to a normal level by the introduction of a subtraction or correction signal. The correction signal is effective only during the time of transmission of green G and cyan C tones, however, since distortion of the red R tones is desired for flesh tone enhancement. Correction of the distortion to magenta M is not required because such distortion rarely, if ever, is perceived by a viewer. The distortions to yellow Y and blue B are small in magnitude, and therefore require no correction. Thus, visually effective correction for distortion introduced by wide angle demodulation can be accomplished by correction of the B-Y color difference signal during transmission of green and cyan colors.

Figure 4:
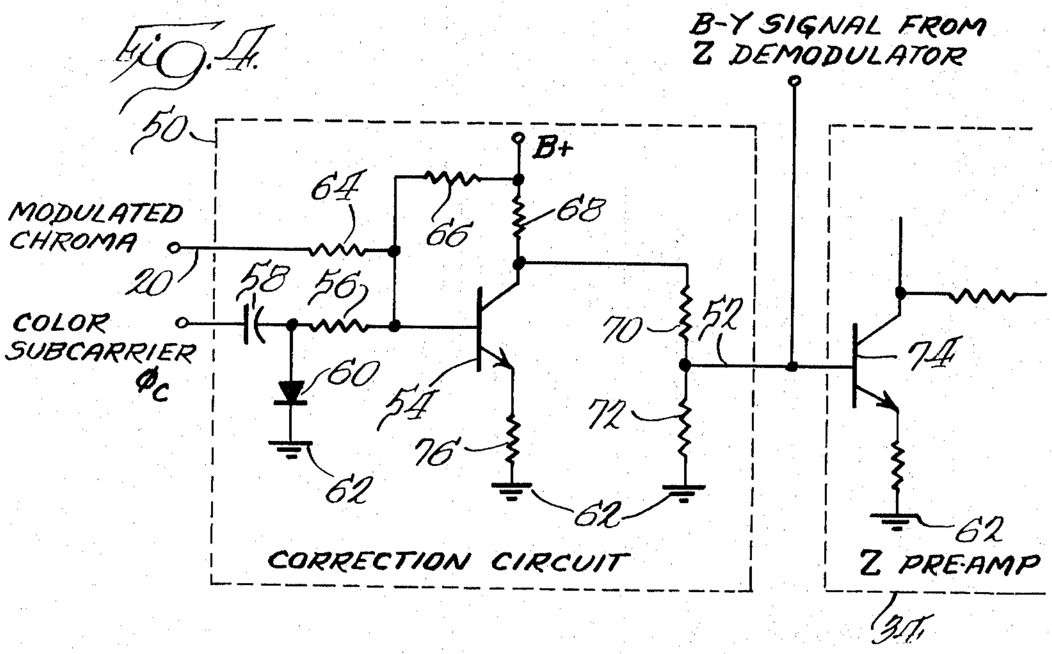
FIG. 4 is a schematic diagram of the correction circuit shown in block form in FIG. 1.
Figure 5:
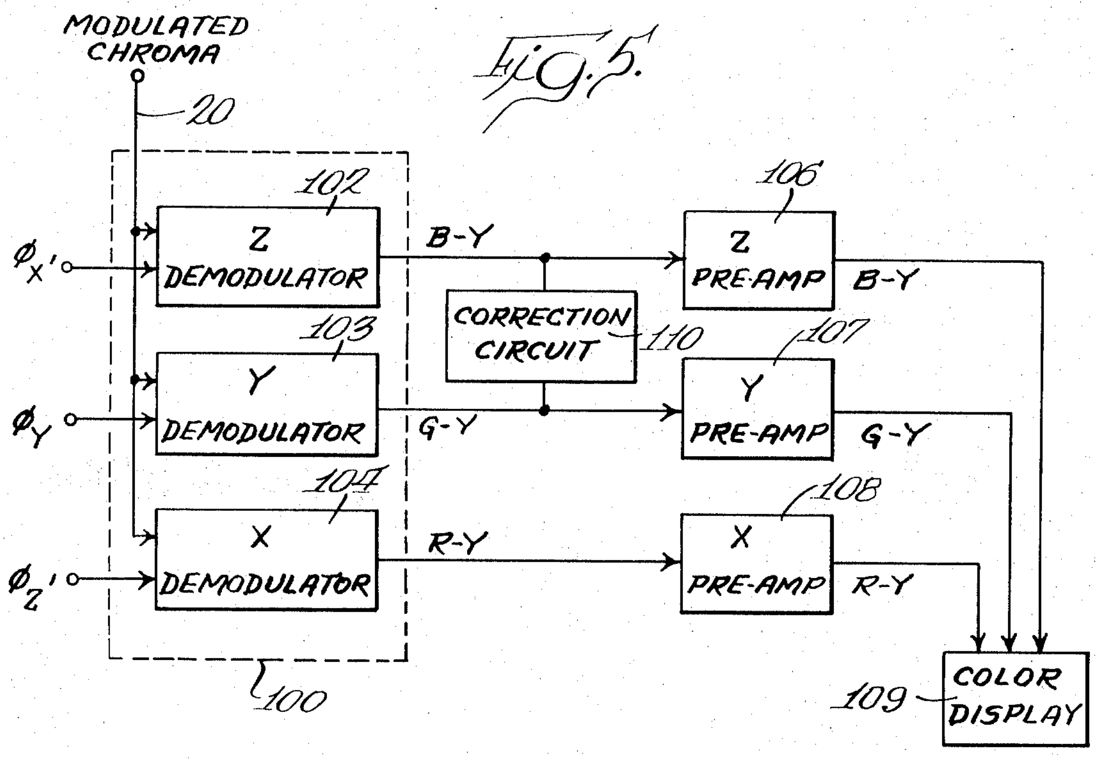
FIG. 5 is a block diagram of another embodiment of a chroma demodulation channel of a color television receiver, which includes a novel hue correction circuit.
Figure 6:
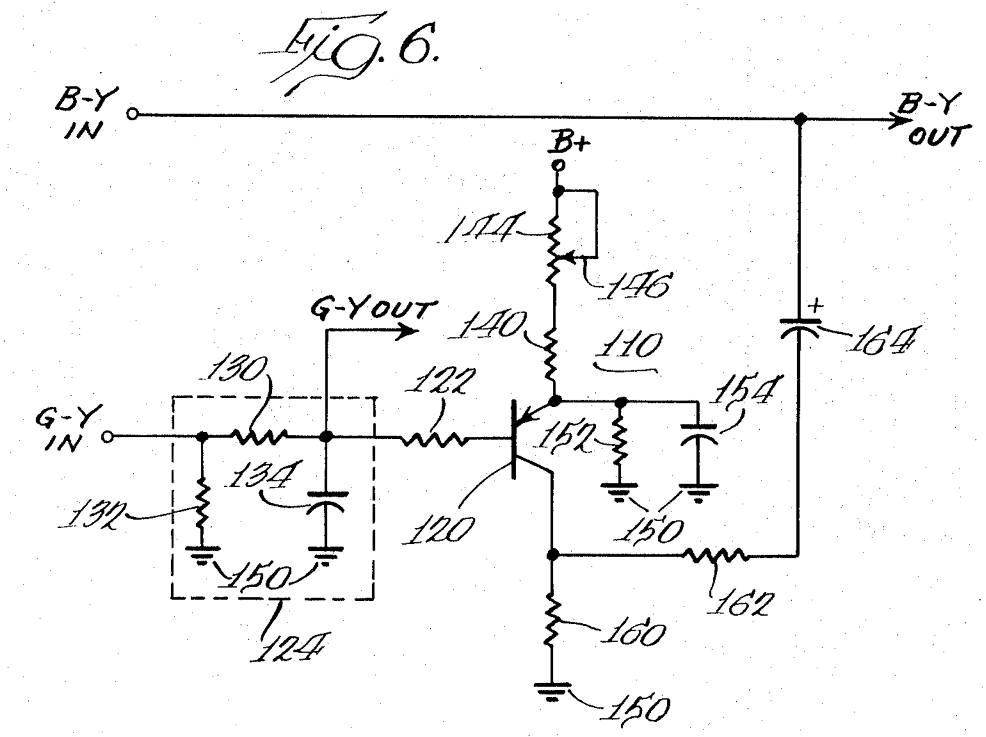
FIG. 6 is a schematic diagram of the correction circuit shown in block form in FIG. 5.

As seen in FIGS. 3B and 3C, both green G and cyan C are unique in similar manners, in that green and cyan are the only colors which produce a large negative R-Y signal, and a large positive G-Y signal. Thus, the presence of a large negative R-Y signal exceeding a level 40 may be used to determine when correction is required to the B-Y signal. A circuit incorporating this detection technique is illustrated in FIGS. 1 and 4. Alternatively, the presence of a large positive amplitude G-Y signal also indicates that green and cyan colors are present. In FIGS. 5 and 6, a correction circuit is illustrated which is keyed into operation by detection of such large positive G-Y signals. Generally, the selection of any particular color difference signal is based on the signals already available in a particular color television receiver.

Returning to FIG. 1, a correction circuit 50 corrects for both green and cyan distortion in the outputs of the wide angle demodulators 22 and 24. The correction circuit is in the form of a third demodulator which demodulates the modulated chroma signal with reference to a reference signal $\phi_c$ from color oscillator and phase shifter 26. The reference signal $\phi_c$ is at a phase angle coinciding with the negative R-Y axis, see FIG. 2.

In FIG. 4, correction circuit 50 is illustrated in detail. Whenever colors in the green and cyan region are present, circuit 50 supplies via a correction line 52 a drive signal to the Z preamplifier 34. This drive signal mixes with the B-Y signal from the Z demodulator in a direction to reduce the absolute value output of the Z preamplifier. Since the resulting B-Y signal is matrixed in circuit 38 of FIG. 1 to develop a G-Y signal, the G-Y output is increased slightly whenever the correction circuit 50 operates to reduce the B-Y drive. This provides an additional desirable correction or compensation for the green and cyan tones.

An NPN transistor 54 is interconnected to act as a single sided phase demodulator or detector for colors in the green-cyan region. The base of transistor 54 is coupled through a 4.7 kilohm resistor 56 and a 0.01 microfarad capacitor 58 to the oscillator line carrying reference signal $\phi_c$. A diode rectifier 60 is coupled between the junction of resistor 56 and capacitor 58, and a source of reference potential or ground 62. The diode has a low forward voltage drop, such as 0.7 volts, when conducting. The transistor base is also coupled through a 1.8 kilohm resistor 64 to line 20 carrying modulated chroma information.

Biasing is provided through a 68 kilohm resistor 66 coupled to a source of B+ potential, such as positive 32 volts DC. The B+ source is also coupled through a 82 kilohm resistor 68 to the collector of transistor 54, and through a voltage divider consisting of a 10 kilohm resistor 70 and a 6.8 kilohm resistor 72 to ground 62. The emitter of transistor 54 is coupled through a 680 ohm resistor 76 to ground 62. The junction between resistors 70 and 72 is coupled to line 52, which in turn is coupled to an NPN transistor 74 in the Z preamplifier 34. The circuit in the Z preamplifier 34 may be of any conventional construction.

In operation, color subcarrier $\phi_c$ (at the phase angle of the negative R-Y vector) is supplied through a clamping circuit formed by capacitor 58 and diode 60. This circuit clamps the color subcarrier to substantially zero in the positive direction, and allows it to swing only in the negative direction. The clamped color subcarrier is supplied through resistor 56 to the base of the transistor. Resistor 66 provides DC bias for the transistor, and resistor 76 controls the amount of emitter degeneration and hence the gain of the circuit. Resistor 66 maintains the transistor just at cut-off, so that small, modulated chroma signals which are in phase with color subcarrier $\phi_c$ will drive transistor 54 into conduction. Resistors 56 and 64 are selected such that the color subcarrier and properly phased chroma information are matrixed in a proportion which drives transistor 54 into conduction whenever a predetermined level of color in the green-cyan region is present.

When transistor 54 is driven on due to a demodulated chroma signal which exceeds the biasing of the transistor, the amplitude of voltage at the collector of transistor 54 depends primarily on the saturation of the chroma signal. Thus, transistor 54 operates essentially as a keyed amplifier having an output proportional to the saturation of green or cyan colors.

Resistors 68, 70 and 72, which determine the DC bias for the base of the Z preamplifier transistor 74, determine the proportion by which the correction signal from transistor 54 is matrixed with the modulated chroma signal on line 20. The DC bias at the base of transistor 74 is decreased in proportion to the conduction level of transistor 54, and the shift in the operating point of transistor 74 results in decreased amplification of the B-Y input signal. Since the level of conduction of transistor 54 is proportional to the saturation of colors in the green-cyan region, the amount by which the B-Y signal from the Z preamplifier is reduced will likewise be proportional to the green-cyan saturation. When green-cyan color is not present, the transistor 54 is maintained off and hence the Z preamplifier transistor 74 operates in a conventional manner.

Another embodiment of the invention is illustrated in FIGS. 5 and 6, and is particularly adaptable for use in color television receivers employing integrated circuits in the chroma section. An integrated circuit demodulator chip 100 provides therein three color demodulators 102, 103 and 104. These demodulators produce color difference outputs B-Y, G-Y and R-Y. Each color difference signal is amplified by a corresponding preamplifier 106, 107 and 108, respectively, to develop amplified color difference signals which drive a color display 109.

In accordance with the present invention, Y demodulator 103 serves a dual function of providing a G-Y output signal, and forming a correction demodulator which detects for the presence of green and cyan information as indicated by a predetermined positive level in the G-Y signal, see FIG. 3C. The presence of such a predetermined level is detected by a correction coupling circuit 110 and introduces a proportional error correction signal in the B-Y channel.

In FIG. 6, the correction circuit 110 is illustrated in detail. A PNP transistor 120 has a base coupled through a 8.2 kilohm resistor 122 to the G-Y line which inputs to the Y preamplifier 107. The G-Y signal from demodulator 103 is supplied through a load shaping network 124, commonly associated with the output of integrated circuit demodulators. A similar network (not illustrated) could be associated with the B-Y line coupled to the Z preamplifier 106. By way of example, such a network 124 may consist of a series resistor 130 of 680 ohms, a shunt resistor 132 of 2.2 kilohms, and a shunt capacitor 134 of 100 picofarads. Network 124 forms a load for the axis demodulator, and also preforms a filtering or shaping function.

The emitter of transistor 120 is coupled in series through a 330 ohm resistor 140 and a potentiometer 144, having a 5 kilohm resistance shunted by a wiper 146, with B+, such as positive 24 volts DC. The emitter is also shunted to a source of reference potential or ground 150 by a 1.8 kilohm resistor 152 and a 270 picofarad capacitor 154. The collector or output side of the transistor is coupled to ground 150 through a 5.6 kilohm resistor 160, and is also coupled through a 1 kilohm resistor 162 and a 3 microfarad capacitor 164 to the B-Y output line.

In operation, resistors 144, 140, 152 and 160 determine the bias and turn-on point for transistor 120. These resistors are selected such that transistor 120 is biased just off, and is driven into conduction when a negative going signal appears at its base. The potentiometer 144 is adjustable by wiper 146 to control the turn on point of the transistor during initial alignment of the receiver. Resistor 122 controls the signal level at the base of transistor 120, and capacitor 154 serves as a bypass for shaping the bandpass response curve of the transistor. Resistor 162 provides isolation and controls the level of the correction signal which is AC coupled to the Z preamplifier input by capacitor 164.

In some television receivers, phase inversions which occur in subsequent sections of the chroma circuitry require a positive going rather than negative going correction signal, and the circuit of FIG. 6 produces a positive going signal at the collector of transistor 120 when the drive to the blue gun of the television cathode ray tube is to be reduced in absolute value. Of course, the circuit could be designed to produce opposite going correction signals. In addition, the separate demodulator 103 could be combined with the level detector and gated output circuit 110, in the manner shown by FIG.

4, if desired. Other modifications will be apparent to those skilled in the art.

We claim:

1. In a color television receiver with chroma channel means for supplying a chroma signal modulated along a pair of modulation axes having a predetermined included angle in a quadrant which contains flesh hues, a hue correction circuit, comprising:

oscillator means for generating a pair of fixed phase reference signals having an included angle different than said predetermined included angle in the quadrant which contains flesh hues;

wide angle demodulator means responsive to said pair of reference signals for demodulating said chroma signal along two demodulation axes at said different included angle to develop color signals with altered hues including altered flesh hues; and correction means responsive to hues contained in a different quadrant adjacent said quadrant which contains flesh hues for altering the amplitude of at least some of said color signals to correct for altered hues in said different quadrant.

2. The hue correction circuit of claim 1 wherein said correction means comprises means for reducing the amplitude of at least some of said color signals in proportion to the amplitude of the hues contained in said different quadrant.

3. The hue correction circuit of claim 1 wherein said oscillator means generates a third fixed phase reference signal which is phase offset from said pair of reference signals, and said correction means comprises correction demodulator means responsive to said third reference signal for demodulating said chroma signal along a third demodulation axis to develop a correction signal in response to hues in the region adjacent said third axis, and coupling means located between said correction demodulator means and said wide angle demodulator means for altering the amplitude of at least some of said color signals in response to said correction signal.

4. The hue correction circuit of claim 3 wherein said correction demodulator means comprises a single sided phase detector for detecting hues in a range narrower than any quadrant defined by said modulation axes.

5. The hue correction circuit of claim 4 wherein said single sided phase detector is responsive to hues in the green-cyan region, and said coupling means includes subtraction means for reducing the amplitude of at least one of said color signals in proportion to the saturation of hues in said region.

6. THe hue correction circuit of claim 4 wherein said single sided phase detector includes rectifier means for clamping the amplitude of said third reference signals, semiconductor means, and biasing means interconnecting said semiconductor means and rectifier means to pass chroma signals coinciding in phase with said third reference signal.

7. The hue correction circuit of claim 1 wherein said wide angle demodulator means develops a pair of color difference signals corresponding approximately to B-Y and R-Y, said correction means in response to green hues develops a correction signal having an amplitude proportional to the saturation of the green hues, and subtraction means for reducing the absolute value of said B-Y color difference signal in proportion to the amplitude of said correction signal.

8. A hue correction circuit for a color television receiver with chroma channel means for supplying a chroma signal, comprising:

oscillator means for generating first, second and third reference signals each at a different phase with respect to a common reference signal;

first demodulator means coupled to said oscillator means for demodulating said chroma signal along a first demodulator axis coinciding with said first reference signal to develop a first color signal;

second demodulator means coupled to said oscillator means for demodulating said chroma signal along a second demodulator axis coinciding with said second reference signal to develop a second color signal;

third demodulator means coupled to said oscillator means for demodulating said chroma signal along a third demodulator axis coinciding with said third reference signal to develop a third color signal;

circuit means coupled between said third demodulator means and one of said first and second demodulator means for modifying the amplitude of the color signal developed thereby in response to said third color signal; and output utilization means responsive to at least the modified amplitude color signal for producing a color display.

9. The hue correction circuit of claim 8 including matrix means coupled to said first and second demodulator means for developing a matrixed color signal from the modified amplitude and the remaining of the first and second color signals, said output utilization means being responsive to the modified amplitude color signal, the remaining of the first and second color signals, and the matrixed color signal to produce a three color display.

10. The hue correction circuit of claim 9 wherein said third demodulator means comprises a singla sided phase detector means for demodulating said chroma signal along only one polarity of said third demodulator axis to cause the third color signal to have an amplitude proportional to the saturation of hues located adjacent said third axis, said circuit means reducing the absolute value of one of said first and second color signals in response to said third color signal.

11. The hue correction circuit of claim 8 including means for coupling the modified color signal, the unmodified of the first and second color signals, and the third color signal to said output utilization means, whereby said third demodulator means produces both a color output signal and a correction signal.

12. The hue correction circuit of claim 11 wherein said first demodulator means produces a first color difference signal corresponding approximately to B-Y, said second demodulator means produces a second difference color signal corresponding approximately to R-Y, said third demodulator means produces a color difference signal corresponding approximately to G-Y, and said circuit means reduces the absolute magnitude of said B-Y color difference signal in proportion to the level of said G-Y color difference signal.

* * * * *